(No Model.)
J. W. IVORY.
RUBBER DAM CLAMP.
No. 513,328. Patented Jan. 23, 1894.
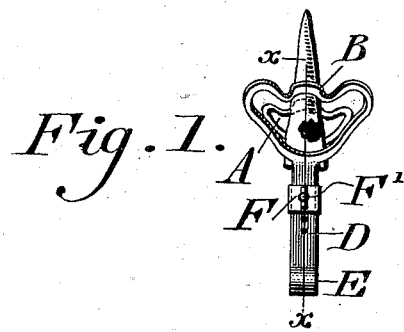
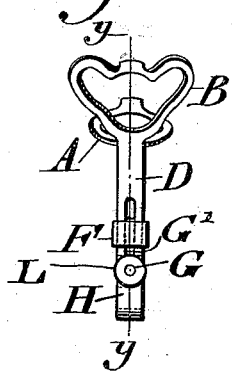

ated January 23, 1894.

UNITED STATES PATENT OFFICE.

JAMES W. IVORY, OF PHILADELPHIA, PENNSYLVANIA.

RUBBER-DAM CLAMP.

SPECIFICATION forming part of Letters Patent No. 513,328, dated January 23, 1894.

Application filed February 13, 1893. Serial No. 462,004. (No model.)

*To all whom it may concern:*

Be it known that I, JAMES W. IVORY, a subject of the Queen of Great Britain, residing in the city and county of Philadelphia, State of Pennsylvania, have invented a new and useful Improvement in Rubber-Dam Clamps, which improvement is fully set forth in the following specification and accompanying drawings.

My invention relates to improvements in that class of instruments called "clamps," and is used for the purpose of carrying the rubber onto the tooth, and to assist in retaining it beyond the margin of decay, as well as to hold the margin of the gum back from the way of the operation, thus preventing laceration, besides better exposing the parts to be operated upon, and as this cavity of decay often extends deep into the gum tissues, an instrument is required for extreme cases to enable the operator to so adjust the jaws of the clamps as will allow one of the jaws to pass higher up on the face of the tooth on that side of the diseased portion. For this purpose I employ a rubber dam clamp formed of jaws and elastic arms which permit the clamp to be readily and conveniently handled and manipulated, and the jaws to be firmly closed and automatically opened, and I furthermore adapt the jaws to be adjusted relatively to each other.

Figures 1, 2 and 4 represent side elevations of rubber dam clamps embodying my invention. Fig. 3 represents a longitudinal section on line $x$, $x$, Fig. 1. Fig. 5 represents a longitudinal section on line $y$, $y$, Fig. 4. Fig. 6 represents a side elevation of the screw in Figs. 4 and 5, on an enlarged scale. Fig. 7 represents a view of a portion of Fig. 3, showing the operation of the screw on the slide therein.

Similar letters of reference indicate corresponding parts in the several figures.

A and B designate the jaws of a rubber dam clamp, and C and D designate arms, each of which is connected with one of the jaws, said arms being joined at their lower or outer ends by the bend E, whereby said arms are elastic in their nature, and adapted to separate automatically, thus similarly opening the jaws, said arms also forming the handle of the device. In order to close the jaws, I employ the slide F, which freely embraces the arms C, D, whereby when it is moved toward the jaws, it draws said arms toward each other, and thus firmly clamps the jaws on the tooth. In order to prevent accidental slipping of the slide F, I apply thereto a set screw F', the same being adapted to tighten against the adjacent arm, the effect of which is evident. When the slide is moved from the jaws, the arms automatically and quickly separate, whereby the jaws separate from the tooth, and the clamp may be displaced.

In order to adjust the jaws relatively to each other as they occupy different planes, the arms are separate pieces and the limbs H and J of the arms are placed against each other and connected by a screw G, which occupies the longitudinal slots G', in said limbs H and J. A slot K is formed in the other arm and freely receives a tongue K' on the limb H, whereby the arms may readily be moved on each other for purposes of adjustment of the jaws. When this adjustment is effected, the nut L on the screw G is tightened, and thus the parts retain their adjusted position, the tongue K' preventing lateral motions or turning thereof. The screw G has the portion $G^2$ of its shank squared or angular, the same occupying the slots G', whereby said screw is prevented from rotating, it being noticed that the head of the screw occupies a position freely between the arms C and D as a washer, thus properly holding the arms apart and preserving the elasticity thereof.

By the use of the slide F, the operator is enabled to determine the extent of pressure exerted to retain the clamp in position, as in different operations different degrees of pressure are required. Should there be any disposition of the slide to move from the jaws or be improperly released, the set screw F' may be employed, which as has been stated, is fitted on the slide and adapted to tighten against the arm. In lieu of said screw, openings may be formed in said arm, as shown in Figs. 1 and 2, and a pin may be passed through the same and thus control the slide. The screw F' may be employed to increase the pressure of the arms or jaws on the tooth, thus increasing the range of adjustability of the slide, and consequently of the jaws, as will be seen in Fig. 7. Screw and spring clamps have been made for this purpose.

The present invention consists of the adaptation of the jaws to the tooth by means of a movable slide, thus giving a quicker and more convenient adjustment. Most spring clamps have to be applied with forceps, and while in applying a screw clamp there is the difficulty of holding the same without slipping and unnecessary wounding the sensitive parts involved. The screw F is also adapted to exert pressure on the arm C and consequently adapt the jaws A and B to a great range of action.

Having thus described my invention, what I claim as new, and desire to secure by Letters Patent, is—

1. A rubber dam clamp having jaw-carrying arms of elastic nature, and a slide on said arms for closing the same and consequently the jaws thereon, substantially as described.

2. A rubber dam clamp having jaw-carrying arms, and a slide on the arms for closing the same, said arms being adjustably connected, substantially as described.

3. A rubber dam clamp having elastic arms adjustable on each other, and a headed screw and clamping nut for securing said arms together, said screw having its head between said arms, said parts being combined substantially as described.

4. A rubber dam clamp consisting of two elastic arms with jaws thereon, each of said arms having a slot in its shank, and one of said arms having on its end a tongue movable in the slot of the other arm, whereby the jaws of said arms may be adjusted relatively to each other, and a headed screw with clamping nut for securing said arms together, said parts being combined substantially as described.

5. The elastic jaw-carrying arms, a slide freely encircling said arms, and a screw fitted to said slide and adapted to hold and adjust the same, substantially as described.

JAMES W. IVORY.

Witnesses:
WILLIAM H. BUCKLEY,
R. H. GRAESER.